APPARATUS FOR REGULATING THE VOLTAGE OF ALTERNATING CURRENT SYSTEMS

Filed Aug. 31, 1921

INVENTOR:
Otto Scheller

Patented Oct. 28, 1924.

1,513,633

UNITED STATES PATENT OFFICE.

OTTO SCHELLER, OF BERLIN-LICHTERFELDE-WEST, GERMANY, ASSIGNOR TO C. LORENZ AKTIENGESELLSCHAFT, OF LORENZWEG, BERLIN-TEMPELHOF, GERMANY.

APPARATUS FOR REGULATING THE VOLTAGE OF ALTERNATING-CURRENT SYSTEMS.

Application filed August 31, 1921. Serial No. 497,280½.

(GRANTED UNDER THE PROVISIONS OF THE ACT OF MARCH 3, 1921, 41 STAT. L., 1313.)

*To all whom it may concern:*

Be it known that I, OTTO SCHELLER, engineer, residing at Berlin-Lichterfelde-West, Germany, have invented certain new and useful Improvements in Apparatus for Regulating the Voltage of Alternating-Current Systems (for which I have filed applications in Germany May 4, 1917, and August 16, 1918, and in Austria Jan. 9, 1919), of which the following is a specification.

According to this invention the regulation of the voltage of alternating-current systems fed from a machine working at varying speed is effected by the insertion of inductance and capacity between the generator and a system being fed thereby. The inductance and capacity which provide additional impedance when the frequency and voltage of the machine increase, are dimensioned so that, even with great variations of speed and consequently with great variations of frequency, the current output of the machine remains practically constant.

The insertion of inductance and capacity between the generating apparatus and the system supplied thereby has already been proposed for machines with constant current and with constant voltage and it is applied on such machines in order to ensure a constant current regardless of the number of lamps cut in. Inductance and capacity can be further inserted as in the well known manner employed in a telegraph system which is fed with alternating current of varying frequency. Inductance and capacity serve in this case to syntonize the different current systems for the frequencies provided for the same and to block the same against other frequencies.

According to this invention the insertion of inductance and capacity between the generating apparatus and the system being fed thereby is utilized for keeping constant the current output of a machine with varying number of revolutions, varying voltage and constant resistance.

By utilizing an alternating current machine excited by steel magnets as a lighting dynamo, collector rings, brushes and collectors are avoided, whereby the security of service is essentially increased. When self-regulating machines are used only a small collector is required which regulates the exciting current.

In order to supply the load, e. g. lamps, uniformly with energy, notwithstanding the varying number of revolutions, the load is not connected directly to the machine but an impedance is inserted which consists of inductance and capacity.

This impedance can be so designed that the apparent resistance of the circuit will increase proportionately to the increase in frequency and voltage so that the total intensity of current remains constant. As the apparent resistance does not consume any energy the current output of the machine remains constant.

Figure 1 diagrammatically represents the device for regulating the voltage of alternating current systems.

Figure 1:
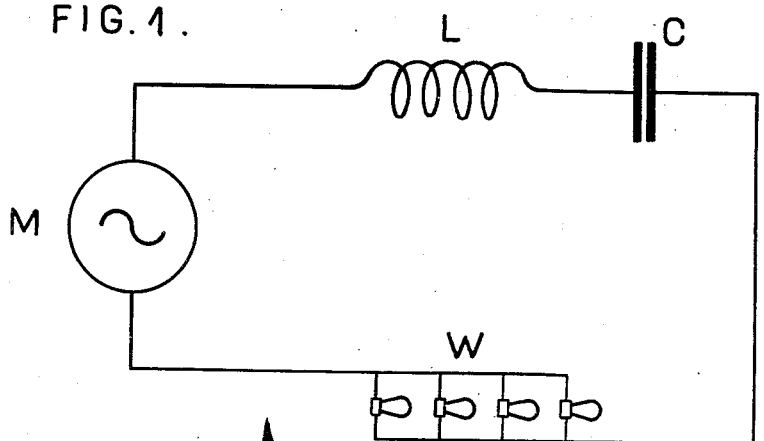
Figure 2:
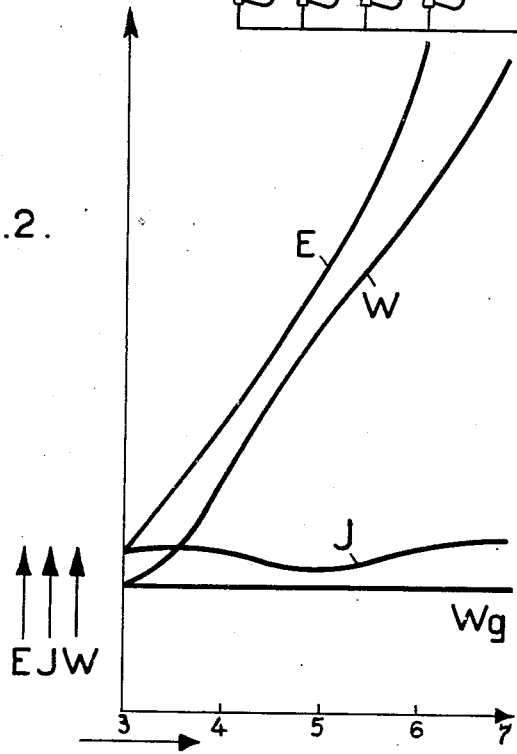
Figure 2 represents curves designating the continuous current resistance and the alternating current impedance.

In Fig. 1 M represents an alternating current dynamo which supplies a load W. Between the machine and load an impedance composed of an inductance L and a capacity C is inserted. If now the voltage of the machine increases as the square of the number of revolutions, approximately corresponding to the curve E in Fig. 2, L and C are so dimensioned that the total impedance of W, L and C (Fig. 1) varies with varying number of revolutions according to the curve of alternating current impedance W (Fig. 2).

The current J accordingly remains at almost a constant value independently of the number of revolutions of the dynamo. The curve for the continuous current resistance is designated by $Wg$.

L and C represent obviously in this example only one of the simplest possible combinations but if the voltage curve of the machine varies according to a complicated law it will be always possible to find a combination of several self-inductances and capacities which corresponds with the voltage curve and compensates the same so that a substantially uniform current is maintained in the consuming circuit. The value of current will be kept substantially constant according to the invention even when the number of revolutions of the machine varies between such limits, as for instance between 500 and 4000 revolutions per minute.

The direct insertion of a capacity in the circuit has under certain conditions the inconvenience that large condensers become necessary for use in systems of low frequency in order to be able to take up the output. Such condensers are not easy to manufacture and they are unfavorable for many purposes in consequence of their large dimensions. Chief among these is the fact that in using dielectrics of such large areas as would be required consideration must be given to the increased number of defects in material by employing a larger factor of safety in design calculations.

Figure 3:
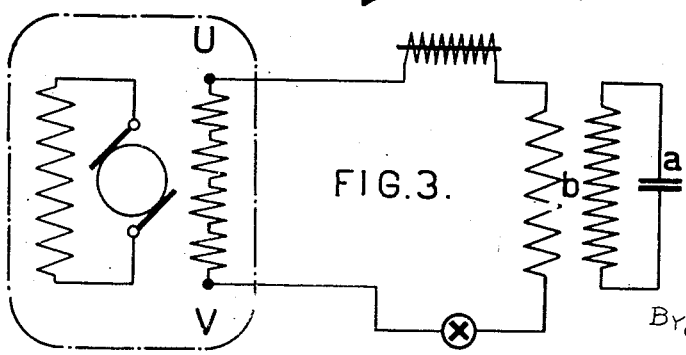
Figure 3 is a modified form of the device shown in Figure 1.

These disadvantages accompanying the use of large condensers can be avoided by inserting a small condenser $a$ with a transformer $b$ (Fig. 3) instead of inserting a large condenser directly in the circuit. In this figure the letters U V designate the terminals of an alternating current machine which works upon a circuit consisting of a self-inductance, a transformer $b$ with a secondary condenser $a$ and a suitable resistance which must be fed with a constant current. In addition to the reduction in size of the condenser that a transformer connected in series therewith permits, this arrangement, also removes the condenser entirely from the load circuit.

I claim:—

The combination with an electric system including an alternator and a load circuit, comprising means for maintaining constant the current flow in said system with fluctuating frequency and consisting of inductance and capacity reactances inserted in the load circuit and so dimensioned as to vary the resulting impedance in the system in accordance with the voltage curve of the supply.

In testimony whereof I have signed this specification in the presence of two witnesses.

OTTO SCHELLER.

Witnesses:
 FRANZ SCHARWENKA,
 LEO TUNGS.